US010106036B2

(12) United States Patent
Chatroux et al.

(10) Patent No.: US 10,106,036 B2
(45) Date of Patent: Oct. 23, 2018

(54) PROTECTING A POWER SUPPLY INCLUDING A PLURALITY OF BATTERIES IN PARALLEL AGAINST AN EXTERNAL SHORT-CIRCUIT (71) Applicants: COMMISSARIAT A L'ENERGIE ATOMIQUE ET AUX ENERGIES ALTERNATIVES, Paris (FR); D C N S, Paris (FR)

(72) Inventors: Daniel Chatroux, Teche (FR); Sebastien Carcouet, Vif (FR); Jacques Ecrabey, Guilherand-Granges (FR); Etienne Durand, Saint Martin d'Heres (FR); Nicolas Pierre, Quimper (FR); Cyrille Garans, Ploemeur (FR); Bernard Keruel, Plougastel-Daoulas (FR)

(73) Assignees: COMMISSARIAT à L'ÉNERGIE ATOMIQUE ET AUX ÉNERGIES ALTERNATIVES, Paris (FR); DCNS, Paris (FR)

( * ) Notice: Subject to any disclaimer, the term of this patent is extended or adjusted under 35 U.S.C. 154(b) by 359 days.

(21) Appl. No.: 15/032,533

(22) PCT Filed: Oct. 22, 2014

(86) PCT No.: PCT/FR2014/052686
§ 371 (c)(1),
(2) Date: Apr. 27, 2016

(87) PCT Pub. No.: WO2015/059408
PCT Pub. Date: Apr. 30, 2015

(65) Prior Publication Data
US 2016/0257202 A1 Sep. 8, 2016

(30) Foreign Application Priority Data
Oct. 27, 2013 (FR) ...................................... 13 60482

(51) Int. Cl.
*B60L 3/00* (2006.01)
*B60L 3/04* (2006.01)
(Continued)

(52) U.S. Cl.
CPC ............... *B60L 3/0046* (2013.01); *B60L 3/04* (2013.01); *B60L 11/1864* (2013.01);
(Continued)

(58) Field of Classification Search
CPC ...... B60L 3/0046; B60L 3/04; B60L 11/1864; H02H 3/087; H02J 2007/0039; H02J 7/0026
See application file for complete search history.

(56) References Cited

U.S. PATENT DOCUMENTS 5,496,654 A * 3/1996 Perkins ................. H01M 10/46
429/1
9,948,086 B2 * 4/2018 Chatroux ............... H02H 3/087
(Continued)

FOREIGN PATENT DOCUMENTS

| EP | 2 053 717 A2 | 4/2009 |
| EP | 2 629 392 A1 | 8/2013 |
| WO | 2013/072362 A1 | 5/2013 |

OTHER PUBLICATIONS

International Search Report dated Jan. 23, 2015 in PCT/FR14/52686 Filed Oct. 22, 2014.

*Primary Examiner* — Scott Bauer
(74) *Attorney, Agent, or Firm* — Oblon, McClelland, Maier & Neustadt, L.L.P.

(57) ABSTRACT

An electrical apparatus, including: a circuit breaker having a breaking capacity and a breaking current; a DC voltage source including two batteries connected in parallel, connected in series with the circuit breaker, the sum of short-circuit currents of the batteries being greater than the break-
(Continued)

ing capacity, each battery including: a first branch including storage batteries and a switch connected in series; a second branch connected in parallel with the first branch and including a free-wheeling diode; an ammeter measuring output current; and a control circuit configured to detect a short-circuit. The control circuits simultaneously keep a majority of switches open and close one switch to apply a current passing through the circuit breaker which is higher than the breaking current and lower than the breaking capacity.

14 Claims, 4 Drawing Sheets

(51) Int. Cl.
    *H02H 3/087* (2006.01)
    *B60L 11/18* (2006.01)
    *H02J 7/00* (2006.01)

(52) U.S. Cl.
    CPC .......... *H02H 3/087* (2013.01); *B60L 2200/18* (2013.01); *B60L 2200/30* (2013.01); *B60L 2200/32* (2013.01); *B60L 2240/549* (2013.01); *H02J 7/0026* (2013.01); *H02J 2007/0039* (2013.01); *Y02T 10/7011* (2013.01); *Y02T 10/7061* (2013.01)

(56) References Cited

U.S. PATENT DOCUMENTS

| | | | |
|---|---|---|---|
| 2009/0102422 A1 | 4/2009 | Naganuma et al. | |
| 2010/0079108 A1* | 4/2010 | Monden | H01M 10/48 320/116 |
| 2012/0274142 A1* | 11/2012 | Tinglow | H02J 7/0026 307/77 |
| 2014/0001863 A1* | 1/2014 | Zhang | G21D 1/02 307/66 |
| 2014/0300194 A1 | 10/2014 | Carcouet et al. | |

* cited by examiner

PROTECTING A POWER SUPPLY INCLUDING A PLURALITY OF BATTERIES IN PARALLEL AGAINST AN EXTERNAL SHORT-CIRCUIT

The invention relates to high-power DC voltage sources and in particular to voltage sources including electrochemical accumulator power batteries connected in parallel. These may be used, for example, in the field of public transport (buses or trolley buses), in the field of renewable energy storage, in the field of maritime navigation or even as standby power supplies in thermal power plants or data centers.

The requisite voltage levels for such applications often exceed several hundred volts. Most often, such voltage sources are based on electrochemical accumulators of the lithium-ion type, which are preferred for their substantial energy storage capacity and limited weight and volume. Lithium-ion iron phosphate ($LiFePO_4$) accumulator technologies are the subject of substantial interest, because of their high intrinsic safety level, which comes at the expense of a slightly lower energy storage density.

An electrochemical accumulator customarily has a nominal voltage of about the following size:
  3.3 V for a lithium-ion iron phosphate ($LiFePO_4$) technology; and
  4.2 V for a lithium-ion technology based upon cobalt oxide.

Therefore, in order to achieve the desired voltage levels, many electrochemical accumulators are connected in series. To obtain high capacities, many electrochemical accumulators are placed in parallel. The association of a plurality of accumulators is called a battery of accumulators.

In certain applications, the powers deployed exceed 100 kWh. For example, the following powers may be deployed in storage batteries: 200 kWh for the propulsion of a bus, between 100 kWh and several MWh for a storage facility associated with a renewable energy generator, and over 100 kWh for a standby storage facility in thermal power plants or in server farms. It is then complicated (specifically in terms of bulk) and hazardous to manufacture and transport voltage sources of very high capacity in a single unit. For this reason, it is customary to separate the voltage sources into a number of batteries having a unitary capacity lower than 50 kWh. A number of batteries are then connected in parallel and/or in series, depending on the desired nominal voltage and/or the desired capacity of the voltage source, thereby facilitating their manufacture and transport.

Batteries, in particular those using lithium-ion accumulators, have a very low internal resistance. Thus, in case of a short-circuit across the terminals of the voltage source (typically a short-circuit in the electrical installation), the current that the batteries are liable to deliver may reach very high values. For high-power applications, electro-mechanical circuit-breakers are used to protect the electrical installation and electrical loads from short-circuits. Such circuit-breakers have a limited breaking capacity. Breaking capacity is the guaranteed maximum current level that the circuit-breaker is capable of opening. Above this level, the circuit-breaker may not be capable of extinguishing the electric arc in the breaking phase. The consequences may then be catastrophic: the circuit-breaker and other hardware may explode, the installation may catch on fire, or indeed the batteries may explode. Electro-mechanical circuit-breakers having a breaking capacity higher than 30 kA are particularly expensive. Furthermore, the breaking capacity of commercially available electro-mechanical circuit-breakers is currently limited to a value of 100 kA. In case of an external short-circuit, the batteries are liable to deliver a current which exceeds the breaking capacity of the electro-mechanical circuit-breaker unless a particularly expensive electro-mechanical circuit-breaker is used. Thus, it is problematic to realize an installation with such DC voltage sources, while complying with electrical protection standards.

Moreover, the short-circuit current delivered by the batteries to the electrical installation must be sufficient to allow the electro-mechanical circuit-breakers to trip and open.

Patent application PCT/EP2012/072607 describes a power supply system comprising a plurality of batteries in parallel. The power supply system supplies an electrical load by way of a circuit-breaker. The batteries in parallel consist of first electrochemical cells electrically connected in series and of a DC/DC converter the output of which is connected in series with said first electrochemical cells. A secondary DC voltage source applies its potential difference to the input of the converter. The converter is voltage-mode controlled.

Such a system proves to be completely unsuitable for managing the appearance of an external short-circuit. Specifically, the converter placed in series comprises a switch for breaking the supply of the converter; however, a flyback diode short-circuits the converter when this switch is open. During an external short-circuit, the batteries deliver a short-circuit current through said flyback diode. For a high-power power supply system, the short-circuit current may be higher than the breaking capacity of the circuit-breaker of the electrical network.

The invention aims to solve one or more of these drawbacks. The invention especially relates to an electrical installation comprising:
  a circuit-breaker having a breaking capacity PdC and a tripping current Is; and
  a DC voltage source comprising at least two electrochemical accumulator batteries connected in parallel, the voltage source being connected in series with the circuit-breaker, the sum of the short-circuit currents of the batteries connected in parallel being higher than the breaking capacity PdC of the circuit-breaker, each of said batteries including:
    a first arm including the electrochemical accumulators of the battery and a switch, which accumulators and switch are connected in series;
    a second arm connected in parallel with the first arm and including a flyback diode;
    an ammeter measuring the current delivered by this battery; and
    a control circuit configured to detect a short-circuit when the current delivered by a battery is higher than a threshold,
  the control circuits being configured, after a short-circuit has been detected, to simultaneously keep at least most of said switches open and to close at least one of said switches in order to apply a current passing through the circuit-breaker higher than the tripping current Is and lower than its breaking capacity PdC.

According to one variant, each of said batteries includes an inductive component connected in series between first and second output terminals of this battery and connected in series with the first and second arms.

According to another variant, said ammeters measure the current passing through said inductive component.

According to another variant, each of said control circuits controls the closing of its switch with a temporal shift relative to the detection of a short-circuit, this temporal shift being different for each of said control circuits.

According to yet another variant, the tripping current Is of the circuit-breaker is a tripping current for a short-circuit of duration less than 100 ms.

According to one variant, the installation comprises at least 10 batteries connected in parallel.

According to another variant, the electrical installation comprises a number n of batteries connected in parallel, and each of these batteries has a short-circuit current $Icc_i$, the breaking capacity PdC of the circuit-breaker being at least 3 times lower than the sum $$\sum_{i=1}^{n} Icc_i$$

of the short-circuit currents of these batteries.

According to yet another variant, said circuit-breaker has a breaking capacity PdC at least equal to 5 kA.

According to one variant, the electrical installation comprises an electrical network connected in series to the DC voltage source and including said circuit-breaker, said electrical network storing an inductive energy at least equal to 2000 J when the current passing therethrough is equal to the breaking capacity PdC of the circuit-breaker.

According to yet another variant, each of said batteries comprises a first set of electrochemical accumulators connected in series, and a second set of electrochemical accumulators connected in series, the electrical installation furthermore comprising a DC/DC converter the output voltage of which is connected in series with said first set of electrochemical accumulators, the second set of electrochemical accumulators applying its potential difference to an input interface of the converter.

According to one variant, said converter of each of said batteries has a step-down voltage regulator structure during the discharge of said second set of electrochemical accumulators.

According to another variant, for each of said batteries:
said step-down voltage regulator structure incorporates a switch-mode step-down voltage regulator comprising two controlled switches connected in series and to the terminals of which is applied the potential difference of the second set of electrochemical accumulators;
said inductive component and said flyback diode belong to said switch-mode step-down voltage regulator structure; and
the switch is connected between a connection node between the controlled switches of the step-down regulator and said inductive component.

According to another variant, said second arm of each of said batteries comprises two flyback diodes connected in series.

According to yet another variant, the control device is configured so that only one of said switches is kept closed simultaneously after detection of a short-circuit.

Other features and advantages of the invention will become more clearly apparent from the description that is given thereof below, by way of wholly nonlimiting indication, and with reference to the appended drawings, in which.

The invention proposes an electrical installation including a DC voltage source equipped with electrochemical accumulator batteries connected in parallel. The DC voltage source formed is connected in series with a circuit-breaker the breaking power of which is lower than the sum of the short-circuit currents of these batteries. Each battery includes two arms in parallel: a first arm with the electrochemical accumulators and a switch in series, and a second arm with a flyback diode.

An ammeter measures the current delivered by each battery in order to detect the appearance of an external short-circuit. The on/off state of the switches is controlled by a respective control circuit. On detection of a short-circuit, most of the switches are kept open so that the current applied to the circuit-breaker is lower than its breaking current, and at least one switch is controlled to close so as to apply to the circuit-breaker a current higher than its tripping current. Thus, continuity of service is guaranteed because of the presence of the respective control circuits, without nonetheless running the risk of creating excessively large electromagnetic disturbances in the electrical network supplied.

Figures 1, 2, 3, 4:
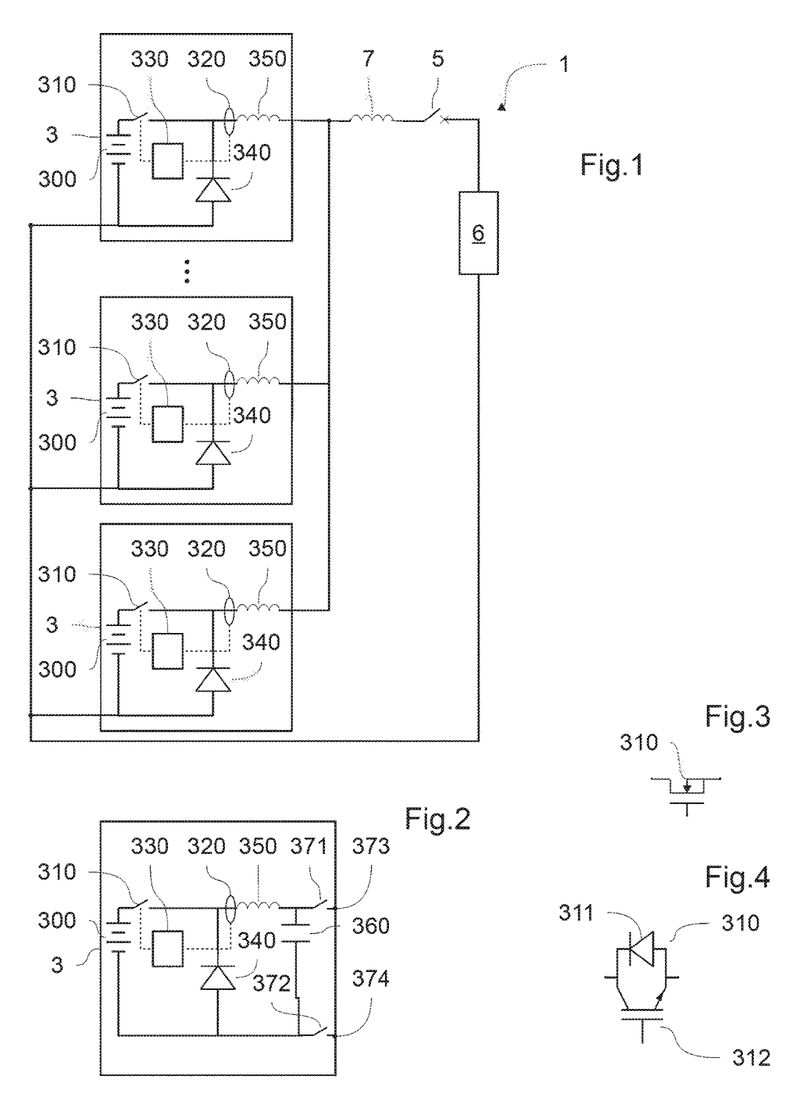
FIG. 1 is a schematic representation of a first embodiment of an electrical installation according to the invention.
FIG. 2 is a schematic representation of an example of a battery usable in an electrical installation according to the invention.
FIG. 3 is a first example of a switch usable in a battery for implementation of the invention.
FIG. 4 is a second example of a switch usable in a battery for implementation of the invention.

FIG. 1 is a schematic representation of an example of an embodiment of an electrical installation 1 according to the invention. The electrical installation 1 comprises a circuit-breaker 5 and a load 6 (which may in practice be a complete electrical network including a multitude of loads) which load is connected in series with the circuit-breaker 5. The parasitic inductance of the electrical network (for example due to cabling or interconnections) of the load 6 is here represented in the form of an inductive component 7 connected in series with the circuit-breaker 5 and the load 6. The electrical installation 1 furthermore comprises a DC voltage source. The DC voltage source comprises a set of batteries 3 (in the form of independent modules) which are electrically connected in parallel. The DC voltage source is connected in series with the circuit-breaker 5 and the load 6, for example by means of electrical power connections, in a manner known per se.

The circuit-breaker 5 has a breaking capacity PdC and a tripping current Is. For example, the tripping current Is of the circuit-breaker 5 will possibly be such that it trips out for a short-circuit with a duration of less than 100 ms, in order to guarantee that the electrical installation 1 responds rapidly to a short-circuit. Other tripping currents may also be envisioned, as detailed with reference to FIG. 10.

In the electrical installation 1, the sum of the short-circuit currents of the batteries 3 is higher than the breaking capacity PdC of the circuit-breaker 5. Given a number n of batteries 3 connected in parallel and designated by an index i, the short-circuit current of a battery i is designated by Icci. The breaking capacity PdC then satisfies the following inequality:

$$PdC < \sum_{i=1}^{n} Icc_i$$

The invention proves to be particularly advantageous when at least 10 batteries 3 are connected in parallel. The invention furthermore proves to be particularly advantageous when the batteries 3 are of the lithium-ion type, these batteries having a relatively low internal resistance and, therefore, a high short-circuit current, for example 30 to 100 times the nominal current of these batteries.

For the sake of simplicity, a set of n batteries 3 having the same short-circuit current Icc will be considered. The electrical installation thus satisfies the relationship $$PdC < n*Icc.$$

Thus, if all the batteries 3 were to deliver their short-circuit current to the circuit-breaker 5, the circuit-breaker 5 could not be guaranteed to open the circuit. The short-circuit current of a battery 3 corresponds to the maximum current that it is capable of delivering with a zero resistance between its terminals, this current then being limited only by the internal impedance of this battery 3.

The invention proves to be particularly advantageous when the current that the set of batteries 3 could deliver is very substantially in excess of the breaking capacity of the circuit-breaker 5. Thus, the invention proves to be particularly advantageous where the following relationship is satisfied:

$$PdC < 3 * \sum_{i=1}^{n} Icc_i$$

Each battery 3 comprises a set of electrochemical accumulators 300 connected in series and/or in parallel. In the variant in FIG. 1, each of the batteries 3 connected in parallel includes a controlled switch 310. Each of the batteries 3 includes:
- a first arm including the set 300 of electrochemical accumulators connected in series with a controlled switch 310. The switch 310 is therefore capable of opening the connection between the electrochemical accumulators 300 and the circuit-breaker 5; and
- a second arm connected in parallel with the first arm and including a flyback diode 340.

The first and second arms are thus connected between the low- and high-voltage terminals of the battery 3. The inductive component 350 of each battery 3 models the sum of parasitic connection inductances of the battery 3 and of an inductive component connected between the high-voltage terminal of the battery 3 and the first and second arms. The battery 3 thus advantageously includes such an inductive component, in order to facilitate the calibration of the inductance. The expression "inductive component" designates an electronic component intended, by its construction, to have a certain inductance. This electronic component will for example be a coil. Advantageously, the inductance of such an inductive component is higher than the parasitic connection inductance of the battery 3. The anode of the diode 340 is thus connected between the low-voltage terminal of the battery 3 and one terminal of the inductive component 350. The inductive component 350 allows the increase in the current in case of short-circuit to be slowed. In order to prevent saturation, one component included in the inductive component 350 will advantageously be an air-core inductive component.

Each battery 3 furthermore includes an ammeter 320 in order to measure the current delivered by the battery 3. In the embodiment illustrated, the ammeter 320 measures the current passing through the inductive component 350. Each battery 3 furthermore comprises a control circuit 330 configured to selectively control the opening of the switch 310. The control circuit 330 collects the current value measured by the ammeter 320.

The control circuit 330 has two operating modes. When the current measured by the ammeter 320 is lower than the trip on short-circuit threshold, the control circuit 330 is in normal operating mode. The control circuit 330 then keeps the switch 310 closed, so that the battery 3 is able to power the load 6. The diode 340 is not turned on in the normal operating mode.

When the current measured by the ammeter 320 is higher than the trip on short-circuit threshold designated by Ib, the control circuit 330 is in short-circuit operating mode. On appearance of an external short-circuit, the current delivered by each of the batteries 3 increases rapidly, the rise in this current mainly being dependent on short-circuit inductance. When the current measured by an ammeter 320 exceeds the threshold Ib, the associated control circuit 330 passes into short-circuit operating mode. In this operating mode, at least most of the switches 310 are kept simultaneously open and one or more switches 310 are selectively closed in order to apply a current through the circuit-breaker 5, so that this current is higher than its tripping current and lower than its breaking capacity.

Thus, it is possible to detect a short-circuit external to the DC voltage source in a very short time, and to keep the current flowing through the circuit-breaker high enough to trip it and low enough to guarantee it opens the circuit. Therefore the circuit-breaker still performs its safety functions, such as opening the circuit (and the absorption of inductive energy upon opening) in the event of a short-circuit and ensuring physical breakage of the circuit, and optionally allowing the user to verify the breakage state. A circuit-breaker having a breaking capacity lower than the sum of the short-circuit currents of the parallel batteries may be used while the operational safety of the electrical installation is guaranteed. High-power electrical installations may therefore be realized with existing circuit-breakers, or less expensive circuit-breakers may be used. A simple electrical installation architecture may be preserved. Furthermore, the triggering selectivity of circuit-breakers of lower rating down-stream of a main circuit-breaker is preserved.

When a switch 310 is open, the associated diode 340 is passed through by a flyback current. The current passing through the associated inductive component 350 then decreases. The control circuits 330 may be programmed to open the switch 310 once the threshold Ib has been detected to have been exceeded. Thus, once a short-circuit has been detected, all the switches 310 will be opened, so that the current flowing through the circuit-breaker 5 starts to decrease.

To apply a current through the circuit-breaker 5 higher than its tripping current, the control circuits 330 are configured to at least temporarily close one of the switches 310, in order to make this current increase. The current through the circuit-breaker 5 may for example be regulated by closing one or more switches 310 when a current through the circuit-breaker 5 reaches a low threshold. By guaranteeing that at least half of the switches 310 are kept open, the amplitude of voltage variations in the electrical network, across the terminals of the DC voltage source, is limited. In particular, measures are taken to prevent a set of independent control circuits 330 having the same logic from closing all of the switches 310 simultaneously, as this would result in a large transient voltage variation across the terminals of the DC voltage source.

Figure 5:
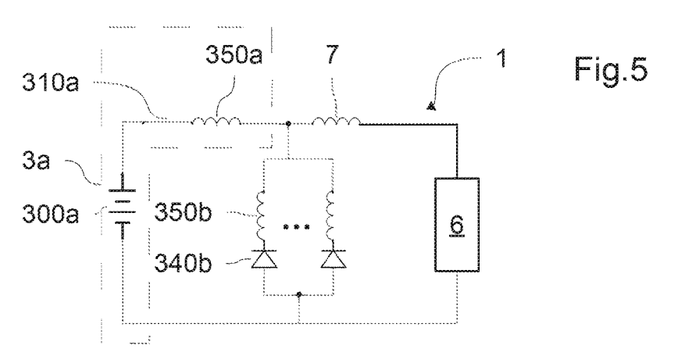
FIG. 5 is an equivalent circuit diagram of an electrical installation during a step of short-circuit operation.

FIG. 5 schematically illustrates the operation of the electrical installation 1 when one switch 310a is kept closed and all the other switches are kept open. For the batteries having their switch open, the flyback diodes 340b allow a current to pass through the inductive components 350b. The electrochemical accumulators 300a of the battery 3a discharge through the associated inductive component 350a. The connection node of the inductive component 350a with the inductive components 350b of the other batteries 3 then sees a small voltage variation.

Specifically, an inductive voltage divider is formed between the inductive component 350a and the inductive components 350b. The higher the number of inductive components 350b connected in parallel (corresponding to the number of switches 310 kept open simultaneously), the lower the voltage on the connection node. Thus, when the switch 310a is subsequently opened the connection node undergoes only a small voltage variation, and this throughout the duration of the short-circuit.

With at least half of the switches kept open simultaneously, it is possible to guarantee that the voltage on the connection node will not exceed the voltage across the terminals of the electrochemical accumulators, even with a transient resonant peak. The invention proves to be particularly advantageous when at least 80% of the switches 310 are kept open in short-circuit operating mode.

Thus the generation of high-frequency electromagnetic disturbances by the DC 30 voltage source is limited, these disturbances possibly disturbing the operation of the load 6. The sizing of an optional circuit (typically a filtering capacitor or a series RC circuit) for filtering these electromagnetic disturbances may thus be considerably lowered.

To take a practical application, the cabling of an electrical network may have a parasitic inductance of about 10 μH in an installation such as a ship. The DC voltage source for example comprises 50 batteries 3 connected in parallel, the impedance 350 of which is about 10 μH. Assuming that each battery 3 is limited to a short-circuit current of 1 kA, the parasitic impedance of the electrical network may be passed through by a current of 350 kA. Whereas each impedance 350 is led to store an energy of 5 J, the parasitic inductance of the electrical network is led to store 12500 J. Such a storage energy would require a circuit for filtering electromagnetic disturbances of considerable sizing if all the switches 310 were to be opened and closed simultaneously. Filtering circuits with such sizing would furthermore have a significant negative impact on the short-circuit behavior of the electrical installation 1 (amplitude of the short-circuit current and risk of oscillation).

Figure 6:
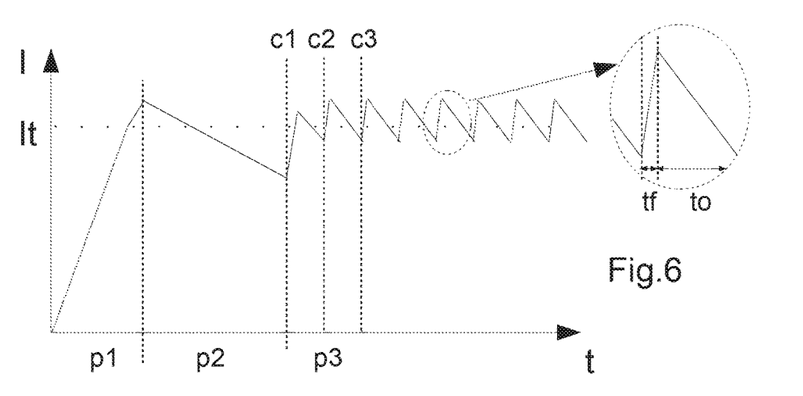
FIG. 6 is a diagram illustrating another example of regulation of short-circuit current.

FIG. 6 is a graph illustrating the current passing through the circuit-breaker 5 with an electrical installation 1 according to one example of an implementation of the invention, during an external short-circuit. During a first phase P1, the switches 310 of the various batteries 3 are kept closed and the current passing through the circuit-breaker 5 increases. At the end of the phase P1, the control circuits 330 detect that the current delivered by their respective battery 3 exceeds the threshold Ib. The scale of the current variations after the phase P1 is intentionally magnified for the sake of readability. During a second phase P2, all the control circuits 330 open their respective switch 310. The current delivered through the circuit-breaker 5 results from the turn-on of all of the flyback diodes 350. The current passing through the circuit-breaker 5 gradually decreases to a value It higher than the detection threshold Is of the circuit-breaker 5. The third phase P3 starts when the current passing through the circuit-breaker 5 reaches the value It. During the third phase, the various batteries 3 sequentially ensure the regulation of the current passing through the circuit-breaker 5. At the instant C1, a first battery ensures the regulation of this current, then at the instant C2, a third battery ensures the regulation of this current, etc.

When a battery 3 ensures the regulation of the current through the circuit-breaker 5, its switch 310 is closed for a length of time tf, until the current through its inductive component 350 reaches a high threshold. The switch 310 is then open length of time t0, until the current reaches the value It. Another battery 3 then ensures the regulation with the closure of its switch 310, the sequential regulation then continues with the various batteries 3.

The control circuits 330 may carry out sequential current regulations, without nonetheless providing for communication amongst themselves. Thus, the circuits 330 may control their switch 310 to close with the same frequency, each control circuit 330 however closing its switch 310 with a different shift relative to the detection of the tripping threshold Ib (programmed for example during the assembly of the DC voltage source). Thus, only one switch 310 is closed at a given instant during the third phase P3.

In this example, only the simultaneous closure of a single switch 310 has been described. Simultaneous closure of a single switch may prove to be sufficient, this closure essentially serving to increase the current through the circuit-breaker 5 relative to a level higher than It maintained by conduction through the flyback diodes. It is however also possible to envision simultaneously closing a plurality of switches 310 in order to ensure a redundancy during the current rises of the third phase P3.

The closure of the switches 310 may be synchronized via a centralized clock signal of the DC voltage source, each control circuit 330 then being equipped with a counter in order to close with a different shift.

If the origin of the external short-circuit disappears, the batteries 3 deliver a lower current and the control circuits 330 then control a change to normal operating mode. The switches 310 are then closed.

Various control modes may be envisioned for independent control circuits 330. For example, it is possible to make provision for each control circuit 330 to be set up in the factory for example so that each control circuit 330 has a specific clock with a different switch 310 closing frequency, so that each control circuit 330 has the same clock frequency but a different shift, or even so that the switches 310 are opened for a random length of time.

Each control circuit 330 may also autonomously make a random draw to determine at regular intervals whether its switch 310 must be closed. For a large number of batteries 3, with a low switch 310 closure duty cycle, the probability of simultaneous closure of more than half of the switches 310 in short-circuit mode is extremely low. With random draws, even though the probability is tiny, more than half of the switches 310 could temporarily be closed simultaneously. The condition of keeping more than half of the switches 310 open will be considered to be satisfied provided that this situation has a probability lower than $10^{-4}$ on each draw.

A natural shift between the closures of the switches 310 may also be obtained by calibrating the inductive components 350 of the various batteries 3 differently. With various inductances, each battery will have a different slope during the increase of the current in the short-circuit phase. Therefore, the current delivered by each of the batteries 3 will reach the tripping threshold Ib at a different instant. However, the switches 310 of the various batteries 3 will possibly be closed at the same frequency.

To shift the closures of the transistors 310, it is also possible to carry out a regulation by hysteresis in each battery 3, by setting different high and low thresholds for each thereof.

Examples of settings for the tripping threshold Ib may be the following:

Ib=Is/n, where Is is the tripping threshold of the circuit-breaker 5 and n the number of batteries 3 connected in parallel;

Ib=1.5*Is/n; and

Ib=PdC/2n, where PdC is the breaking capacity of the circuit-breaker 5 and n the number of batteries 3 connected in parallel.

FIG. 2 is a schematic representation of one variant of a battery 3 usable in an electrical installation 1. The battery 3 according to this variant advantageously includes a decoupling capacitor 360. The capacitor 360 is connected in parallel with the first and second arms. Such a capacitor 360 advantageously allows the effects of the various parasitic inductances on the operation of the control circuit 330 to be limited. Although all the variant batteries 3 described do not include a decoupling capacitor, a battery 3 of an installation 1 according to the invention may of course include such a decoupling capacitor.

In the variant in FIG. 2, the battery 3 includes contactors 371 and 372. These contactors 371 and 372 are connected in series with the first and second arms, between the high-voltage terminal 373 and the low-voltage terminal 374. These contactors 371 and 372 allow the battery 3 to be selectively connected/disconnected 30 from the electrical installation 1.

In order to allow the battery 3 to both be discharged and charged, the switch 310 is advantageously able to conduct current bidirectionally. The battery 3 may then be charged either by a charger connected to an external electrical supply, or from a current returned by the load 6 (for example regenerative braking for an electric motor).

FIG. 3 illustrates a first example of a bidirectional current switch 310. The switch 310 here includes an n-channel MOS transistor the source of which is connected to the cathode of the diode 340 and the gate of which is controlled by the control circuit 330.

FIG. 4 illustrates a second example of a bidirectional current switch 310. The switch 310 here includes an IGBT transistor 312 and a diode 311 mounted in antiparallel.

Various types of transistors may possibly be used as conduction/breaking components for the switch 310 function. The use of transistors especially allows sufficiently rapid switch 310 opening speeds to be obtained before the current passing through the circuit-breaker 5 reaches its breaking capacity.

Figure 7:
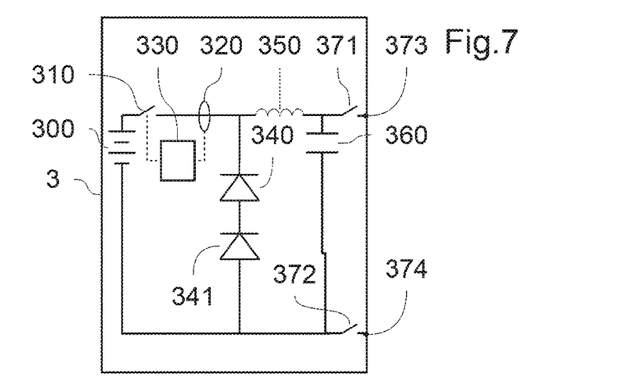
FIG. 7 is a schematic representation of another example of a battery usable in an electrical installation according to the invention.

FIG. 7 is a schematic representation of one variant battery 3 usable in an electrical installation 1. The battery 3 according to this variant advantageously includes two flyback diodes 340 and 341 that are connected in series. The diodes 340 and 341 are thus connected between the low-voltage terminal of the battery 3 and one terminal of the inductive component 350. The failure mode of a diode generally being to short-circuit, the presence of the two diodes 340 and 341 connected in series makes it possible both to ensure the continuity of operation of the battery 3 but also to prevent a short-circuit across the terminals of this battery 3 in case of failure of one of these diodes.

This variant also makes it possible to test the control circuit, diodes and switch.

To test the diodes, it is possible to follow the following procedure:

close the switch 310;

open the contactors 371 and 372;

measure the intermediate voltage between the flyback diodes 340 and 341. This voltage must here be of intermediate value between 0 and Vbat (where Vbat is the voltage across the terminals of the accumulators 300). This value depends on the difference in the leakage current of the two diodes. If this voltage is zero, the diode connected to the negative pole of the battery is short-circuited. If this voltage is equal to Vbat, the second diode is short-circuited. Because of the different leakage currents of the diodes 340 and 341, in order to ensure a distribution of the voltages across the terminals of the diodes 340 and 341, it is possible to add high-resistance resistors in parallel with the diodes. Preferably, it is also possible to adjoin two resistors of identical resistances in parallel with the two diodes that let pass a current several times higher than the leakage current of the diodes. In this case, the voltage must be about Vbat/2; and measure the voltage across the terminals of the flyback diodes 340 and 341. This voltage must here be equal to Vbat.

To test the switch 310 and the control circuit, it is possible to follow the following procedure:

close the contactors 371 and 372;

open the switch 310;

measure the voltage across the terminals of the flyback diodes 340 and 341. This voltage must here be lower than Vbat and equal to 2*Vd, in the presence of a flyback current;

in the presence of a flyback current, measure the intermediate voltage between the flyback diodes 340 and 341. This voltage must here be equal to Vd, where Vd is the threshold voltage of the diodes 340 and 341 (assumed to be identical for the diodes 340 and 341);

close the switch 310; and measure the voltage across the terminals of the flyback diodes 340 and 341. This voltage must here be equal to Vbat.

Figure 8:
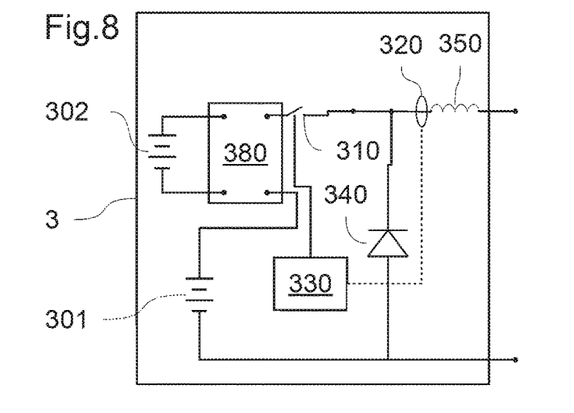
FIG. 8 is a schematic representation of another example of a battery usable in an electrical installation according to the invention.

FIG. 8 is a schematic representation of another variant battery 3 usable in an electrical installation 1. This battery 3 comprises first electrochemical accumulators 301 connected in series and a DC/DC converter 380. Another DC voltage source is connected to the input of the converter 380. This other DC voltage source here comprises second electrochemical accumulators 302. The output of the converter 380 is electrically connected in series with the electrochemical accumulators 301.

Such a battery 3 allows its voltage to be adapted to the voltage of the other batteries 3 to which it must be connected in parallel. Such batteries prove to be particularly advantageous when they have different properties (because of their state of charge, manufacturing dispersions, or differences in age or wear). Such a battery 3 moreover allows its voltage to be adapted with low losses, for an optimized bulk and cost. Specifically, the conversion is here carried out only on the voltage of the electrochemical accumulators 302, the nominal voltage of which is typically at least five times lower than the nominal voltage of the electrochemical accumulators 301.

Figure 9:
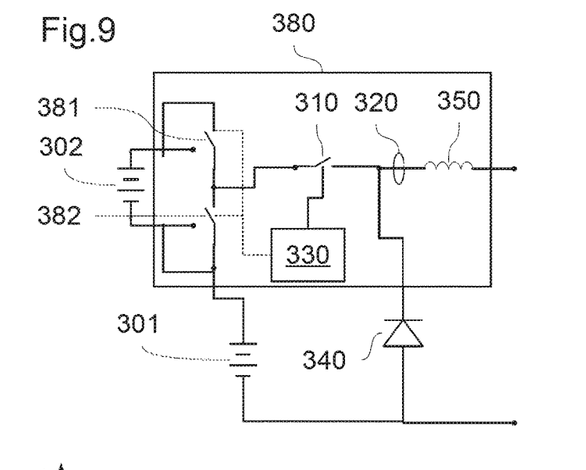
FIG. 9 is a schematic representation of the battery in FIG. 8 with a step-down voltage converter.

FIG. 9 illustrates a battery 3 with one variant of a converter 380. The converter 380 is here based on the use of switches 381 and 382 and of the inductive component 350. The switches 381 and 382 are connected in series and controlled by the control circuit 330. The inductive component 350 is connected between the high-voltage terminal of the battery 3 and a connection node between the switches 381 and 382 by way of the switch 310. The set of electrochemical accumulators 302 is connected to the connection node by way of the switch 381 and of the switch 382, respectively.

The symbol a designates the closure duty cycle of the switch 381 defined by the control circuit 330. The control circuit 330 defines a closure duty cycle (1−α) for the switch 382. As is known per se, the control circuit keeps the switch 381 open and the switch 382 closed simultaneously, and vice versa. The control circuit 330 defines the value of the duty cycle a depending on the desired output voltage of the battery 3.

The converter 380 therefore acts as a step-down voltage regulator in accumulator 302 discharge mode and a step-up voltage regulator in accumulator 302 charge mode.

The switches 381 and 382 of the converter 380 are preferably of the normally open type.

The circuit-breaker 5 is, for example, a thermomagnetic circuit-breaker or an electronic circuit-breaker. An electronic circuit-breaker is equipped with:
   an ammeter measuring the current flowing therethrough;
   an electromechanical member allowing the circuit between the terminals of the circuit-breaker to be opened; and
   an electronic circuit processing the current measurement of the ammeter and generating a command to open the electromechanical member depending on the current measurement.

Figure 10:
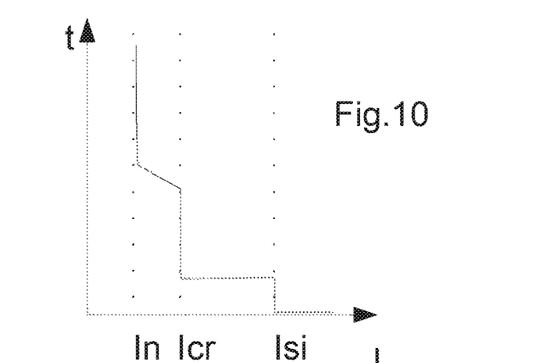
FIG. 10 illustrates an example of a trip curve for an electronic circuit-breaker.

FIG. 10 illustrates an exemplary trip curve for such an electronic circuit-breaker. Here the electronic circuit-breaker includes three tripping thresholds:
   the first tripping threshold In is for a limited current overload of long duration (typically between several tens of seconds and several minutes). This tripping threshold is analogous to the thermal tripping threshold of a thermomagnetic circuit-breaker;
   the second tripping threshold Icr is for a relatively high current overload of average duration (typically between 100 ms and several seconds). This tripping threshold is analogous to the magnetic tripping threshold of a thermomagnetic circuit-breaker; and
   the third tripping threshold Isi is for a dead short-circuit, with almost instantaneous detection and opening within less than 100 ms after said detection.

The third tripping threshold of the circuit-breaker 5 may be delayed in order to allow circuit-breakers of lower rating to open downstream arms, in order to guarantee the selectivity of the electric circuit.

In the examples detailed above, the ammeter 320 measures the series current passing through the inductive component 350. However, it is also possible to envision measuring the current passing through the first arm, this measurement however not delivering the current value passing through the inductive component 350 during the opening of the switch 310.

Figure 11:
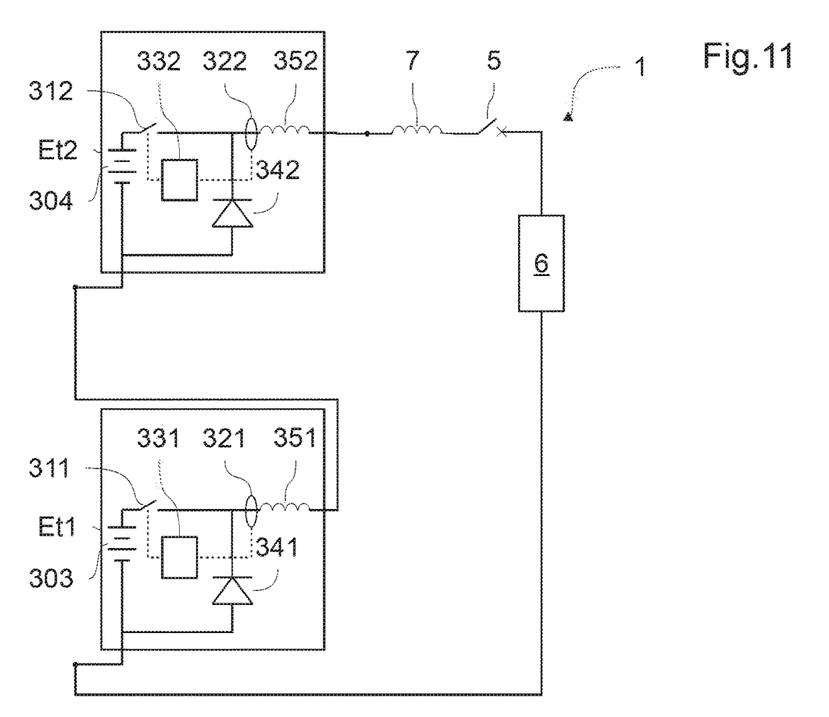
FIG. 11 illustrates an example of a DC voltage source comprising a plurality of stages in series, each stage comprising a plurality of batteries connected in parallel.

FIG. 11 illustrates an example of a DC voltage source comprising a plurality of stages in series, each stage comprising a plurality of batteries connected in parallel. The DC voltage source here includes a first stage Et1 and a second stage Et2, which stages are connected in series. For the sake of simplicity, only one of the batteries connected in parallel in each stage has been illustrated. These batteries have the same structure as those detailed with reference to FIG. 1. The battery illustrated for the stage Et1 thus includes a set 303 of electrochemical accumulators, a switch 311, an ammeter 321, a control circuit 331, a diode 341, and an inductive component 351. The battery illustrated for the stage Et2 thus includes a set 304 of electrochemical accumulators, a switch 312, an ammeter 322, a control circuit 332, a diode 342, and an inductive component 352.

Advantageously, the stages Et1 and Et2 are configured to have short-circuit currents that are regulated to be different or to have different short-circuit detection thresholds.

It1 and It2 are the respective regulated short-circuit currents in the stages Et1 and Et2 and Ib1 and Ib2 are the current thresholds for the detection of a short-circuit, where It1>It2 and Ib1>Ib2. On the appearance of a short-circuit, the latter is detected earlier in the stage Et2, once the threshold Ib2 is reached in each battery of the stage Et2. The switches 312 open before the switches 311. A short-circuit current delivered by the stage Et1 then passes through the flyback diodes 342 of the stage Et2. The switches 312 remain open because the short-circuit current delivered through the flyback diodes exceeds the regulation threshold It2. When the short-circuit current reaches Ib1 in each battery of the stage Et1, the switches 311 also open. The regulation is then in practice carried out in the stage Et1.

In the particular case where the control circuits 332 employ hysteresis control to control the switches 312, the switches 312 may be periodically closed but they immediately reopen because the current passing therethrough is higher than the threshold Ib2.

Such a design with the stages Et1 and Et2 configured to have different regulated short-circuit currents or to have different short-circuit detection thresholds especially makes it possible to avoid a possible oscillation between stages.

The flyback diodes 342 must then be specified to withstand the short-circuit current of the stage Et1.

The invention claimed is:
1. An electrical installation, comprising:
   a circuit-breaker having a breaking capacity and a tripping current; and
   a DC voltage source comprising at least two electrochemical accumulator batteries connected in parallel, the voltage source being connected in series with the circuit-breaker;
   wherein the sum of short-circuit currents of the batteries connected in parallel is higher than the breaking capacity of the circuit-breaker, each of the batteries including:
      a first arm including the electrochemical accumulators of the battery and a switch, which accumulators and switch are connected in series;
      a second arm connected in parallel with the first arm and including a flyback diode;
      an ammeter measuring current delivered by this battery; and a control circuit configured to detect a short-circuit when the current delivered by a battery is higher than a threshold;

the control circuits configured, after a short-circuit has been detected, to simultaneously keep at least most of the switches open and to close at least one of the switches to apply a current passing through the circuit-breaker higher than the tripping current and lower than its breaking capacity.

2. The electrical installation as claimed in claim 1, wherein each of the batteries includes an inductive component connected in series between first and second output terminals of the battery and connected in series with the first and second arms.

3. The electrical installation as claimed in claim 2, wherein the ammeters measure current passing through the inductive component.

4. The electrical installation as claimed in claim 1, wherein each of the control circuits controls closing of its switch with a temporal shift relative to detection of a short-circuit, the temporal shift being different for each of the control circuits.

5. The electrical installation as claimed in claim 1, wherein the tripping current of the circuit-breaker is a tripping current for a short-circuit of duration less than 100 ms.

6. The electrical installation as claimed in claim 1, comprising at least 10 batteries connected in parallel.

7. The electrical installation as claimed in claim 1, comprising a number n of batteries connected in parallel, and wherein each of the batteries has a short-circuit current $Icc_i$, breaking capacity of the circuit-breaker being at least 3 times lower than the sum $$\sum_{i=1}^{n} Icc_i$$

of the short-circuit currents of the batteries.

8. The electrical installation as claimed in claim 1, wherein the circuit-breaker has a breaking capacity at least equal to 5 kA.

9. The electrical installation as claimed in claim 1, comprising an electrical network connected in series to the DC voltage source and including the circuit-breaker, the electrical network storing an inductive energy at least equal to 2000 J when the current passing therethrough is equal to the breaking capacity of the circuit-breaker.

10. The electrical installation as claimed in claim 1, wherein each of the batteries comprises a first set of electrochemical accumulators connected in series, and a second set of electrochemical accumulators connected in series, the electrical installation further comprising a DC/DC converter, an output voltage of which is connected in series with the first set of electrochemical accumulators, the second set of electrochemical accumulators applying its potential difference to an input interface of the converter.

11. The electrical installation as claimed in claim 10, wherein the converter of each of the batteries includes a step-down voltage regulator structure during discharge of the second set of electrochemical accumulators.

12. The electrical installation as claimed in claim 11, wherein for each of the batteries:
the step-down voltage regulator structure incorporates a switch-mode step-down voltage regulator comprising two controlled switches connected in series and to terminals of which is applied the potential difference of the second set of electrochemical accumulators;
the inductive component and the flyback diode belong to the switch-mode step-down voltage regulator structure; and
the switch is connected between a connection node between the controlled switches of the step-down regulator and the inductive component.

13. The electrical installation as claimed in claim 1, wherein the second arm of each of the batteries comprises two flyback diodes connected in series.

14. The electrical installation as claimed in claim 1, wherein the control device is configured so that only one of the switches is kept closed simultaneously after detection of a short-circuit.

* * * * *